United States Patent [19]

Smith et al.

[11] Patent Number: 5,288,821
[45] Date of Patent: Feb. 22, 1994

[54] POLYMERIC ELECTRICAL INSULATION MATERIALS

[75] Inventors: James D. B. Smith, Monroeville; Allan I. Bennett, Export, both of Pa.; Emil M. Fort, Maitland, Fla.

[73] Assignee: Westinghouse Electric Corp., Pittsburgh, Pa.

[21] Appl. No.: 907,085

[22] Filed: Jul. 1, 1992

[51] Int. Cl.$^5$ ............................................. C08F 283/00
[52] U.S. Cl. ..................................... 525/529; 528/88; 528/92; 528/137
[58] Field of Search ...................... 525/529; 528/88, 92, 528/137

[56] References Cited

U.S. PATENT DOCUMENTS

| | | | |
|---|---|---|---|
| 3,577,346 | 5/1971 | McKeown | 252/63.5 |
| 3,622,524 | 11/1971 | Markovitz et al. | 260/2 EC |
| 3,728,306 | 4/1973 | Markovitz et al. | 260/47 EC |
| 3,769,226 | 10/1973 | Markovitz et al. | 252/182 |
| 4,173,593 | 11/1979 | Smith et al. | 525/109 |
| 4,343,922 | 8/1982 | Shaffer | 525/389 |
| 4,427,740 | 1/1984 | Stackhouse et al. | 428/383 |
| 4,447,797 | 5/1984 | Saunders et al. | 522/25 |
| 4,515,882 | 5/1985 | Mammino et al. | 430/900 |
| 4,650,840 | 3/1987 | Mosher | 528/506 |
| 4,933,421 | 6/1990 | Morehead | 528/91 |

*Primary Examiner*—Robert E. Sellers
*Assistant Examiner*—Randy Gulakowski

[57] ABSTRACT

Electrical insulation materials containing a synergistic mixture of either a metal acetylacetonate and a dicyclopentadienyl metal compound, a chromium salt and a dicyclopentadienyl compound, or a chromium salt and a metal acetylacetonate have unexpectedly high levels of corona resistance. The insulation materials preferably are prepared by dissolving the synergistic mixture in an organic resin such as an epoxy resin and then curing the resin.

16 Claims, 4 Drawing Sheets

POLYMERIC ELECTRICAL INSULATION MATERIALS

FIELD OF THE INVENTION

This invention relates to polymeric electrical insulation materials and, more particularly, to materials having improved corona resistance due to their inclusion of synergistic mixtures of metal salts and/or metal complexes.

BACKGROUND OF THE INVENTION

Electrical insulation for high-voltage applications should ideally be completely solid and free of internal gas-filled voids. In practice, however, such insulation usually contains some internal voids due, for example, to bubbles from internally evolved gas during cure, to cracking or delamination from mechanical stress, or to incomplete impregnation of resin-impregnated systems. When alternating voltage is applied to such insulation, a portion of the voltage appears across these internal voids. At sufficiently high applied voltage, the voltage appearing across the void will cause electrical discharges in the gas within the void. These discharges, known as "partial discharges" or sometimes as "corona discharges", typically recurring once or more every half cycle of the applied voltage, will gradually erode the insulation and eventually result in failure. This is the primary failure mechanism for high-voltage electrical insulation, particularly for insulation systems involving organic resins.

Suppressing corona discharges would make it possible to increase the electrical lifetime of the insulation or to raise the voltage stress at which the insulation could be used, thereby permitting reduction of the required insulation thickness.

U.S. Pat. Nos. 3,622,524, 3,728,306, and 3,769,226, all in the name of Markovitz, et al., disclose that an electrical insulation material characterized by a good dissipation factor, a high heat distortion temperature and good corona resistance can be prepared by curing an epoxy resin with from about 20 to about 120 parts by weight per 100 parts of epoxy resin of an organotin compound that has been pre-reacted with an organic acid or anhydride material. Markovitz, et al. disclose that useful organotin compounds include dialkyltin and diaryltin oxides, organostannoic acids, organotin esters and organotin halides, which provide for ready entry of the tin into the organic insulation material.

U.S. Pat. No. 3,577,346, in the name of McKeown, discloses an insulating dielectric polymer that contains a minor amount of an organometallic compound of a metal selected from silicon, germanium, tin, lead, phosphorous, arsenic, antimony, bismuth, iron, ruthenium, and nickel. For example, McKeown discloses that the inclusion of ferrocene improves the corona life of a cured epoxy resin.

U.S. Pat. No. 4,173,593, in the name of Smith, et al., discloses that varnishes for coating large electrical component insulation can be prepared by reacting epoxy resin and maleic anhydride in the presence of a catalyst and then adding other ingredients such as styrene, along with a room temperature stabilizer, a polycarboxylic anhydride, a peroxide or azo compound as a catalyst, and an amount of a selected metal acetylacetonate acting as a latent accelerator.

It would be of great advantage to provide novel electrical insulation materials, particularly insulation materials having improved corona resistance relative to the insulation materials presently known in the art.

SUMMARY OF THE INVENTION

It has been discovered in accordance with the present invention that electrical insulation materials having unexpectedly high levels of corona resistance can be prepared by incorporating into an electrically insulating polymer a synergistic mixture comprising either: (1) a metal acetylacetonate and a dicyclopentadienyl metal compound; (2) a chromium salt and a dicyclopentadienyl metal compound; or (3) a chromium salt and a metal acetylacetonate. The novel insulation materials of the invention preferably are prepared by dissolving the synergistic mixture in an organic resin such as an epoxy resin and then curing the resin.

BRIEF DESCRIPTION OF THE DRAWINGS

The numerous objects and advantages of the present invention can be better understood by those skilled in the art by reference to the accompanying figures, in which.

DETAILED DESCRIPTION OF THE INVENTION

Figure 1:
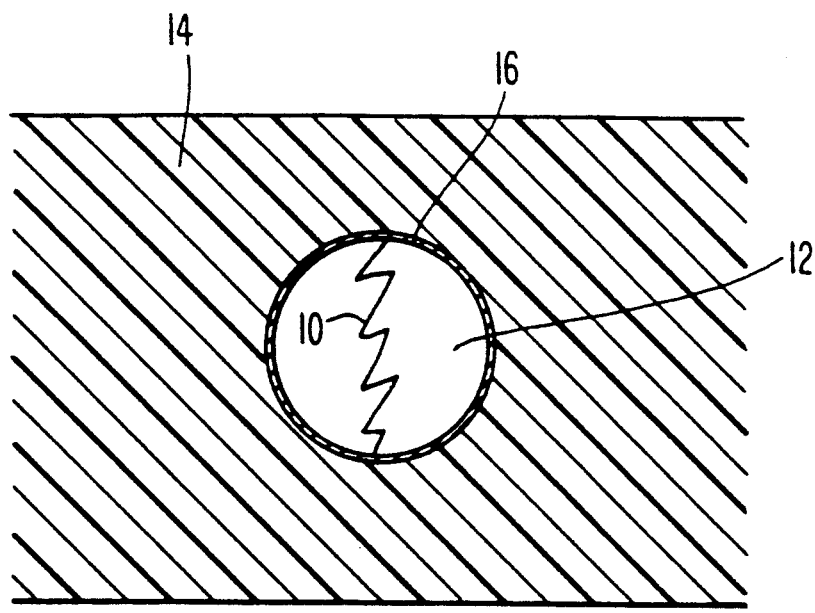
FIG. 1 is a cross-sectional view of an electrical insulation material,, according to the invention.

Electrical insulation materials having improved corona resistance are prepared in accordance with the present invention by incorporating a synergistic mixture into an electrically insulating polymer. It is preferred that the synergistic mixture actually be dissolved in the polymer. The synergistic mixture comprises either metal acetylacetonate and dicyclopentadienyl metal compound, chromium salt and dicyclopentadienyl metal compound, or chromium salt and metal acetylacetonate. It is believed that the corona resistance of virtually any insulating polymer known in the art can be improved in this manner. Preferred polymers are those prepared from epoxy, polybutadiene, urethane, acrylic, or polyethylene resins or combinations thereof. Polymers prepared from epoxy resin are particularly preferred. Representative epoxy-based polymers are disclosed by U.S. Pat. No. 4,173,593 (Smith, et al.), the contents of which are incorporated herein by reference.

The metal acetylacetonate can be any of those known in the art, including chromium (III) acetylacetonate, manganese (III) acetylacetonate, iron (III) acetylacetonate, zinc (II) acetylacetonate, aluminum (III) acetylacetonate, sodium (I) acetylacetonate, uranyl (VI) acetylacetonate, vanadium tris acetylacetonate, cobalt (II) acetylacetonate, cobalt (III) acetylacetonate, gallium acetylacetonate, or combinations thereof. Chromium (III) acetylacetonate is particularly preferred.

A wide variety of chromium salts can be used in accordance with the invention. It will be understood that the term "chromium salt" as used herein includes chromium coordination complexes. Representative chromium salts include chromium (III) acetylacetonate, chromium (III) trifluoro-acetylacetonate, chromium (III) hexafluoroacetylacetonate, chromium (III) acetate, chromium (III) butyrate, and chromium hexacarbonyl.

As recognized by those skilled in the art, dicyclopentadienyl metal compounds, equivalently known as metallocenes, are coordination complexes of a metal atom and two cyclopentadiene rings. Representative dicyclopentadienyl metal compounds include dicyclopentadienyl iron (ferrocene), dicyclopentadienyl nickel (nickelocene), dicyclopentadienyl cobalt (cobaltocene), and dicyclopentadienyl molybdenum (molybdocene). Dicyclopentadienyl iron is preferred.

The synergistic mixtures of the invention can be present in the polymeric insulation materials of the invention in any proportion effective to improve the corona resistance of the insulation material. In embodiments wherein the synergistic mixture includes metal acetylacetonate and dicyclopentadienyl metal compound, the insulation material should contain from about 0.001 to about 0.5 weight percent metal acetylacetonate and from about 0.01 to about 10 weight percent dicyclopentadienyl metal compound, preferably from about 0.02 to about 0.2 weight percent metal acetylacetonate and from about 0.05 to about 2 weight percent dicyclopentadienyl metal compound, more preferably about 0.05 weight percent metal acetylacetonate and about 0.3 weight percent dicyclopentadienyl metal compound.

In embodiments wherein the synergistic mixture includes chromium salt and dicyclopentadienyl metal compound, the insulation material should contain from about 0.001 to about 0.5 weight percent chromium salt and from about 0.01 to about 10 weight percent dicyclopentadienyl metal compound, preferably from about 0.02 to about 0.2 weight percent chromium salt and from about 0.05 to about 2 weight percent dicyclopentadienyl metal compound, more preferably about 0.05 weight percent chromium salt and about 0.3 weight percent dicyclopentadienyl metal compound.

In embodiments wherein the synergistic mixture includes chromium salt and metal acetylacetonate, the insulation material should contain from about 0.001 to about 0.5 weight percent chromium salt and from about 0.01 to about 10 weight percent metal acetylacetonate, preferably from about 0.02 to about 0.2 weight percent chromium salt and from about 0.05 to about 2 weight percent metal acetylacetonate, more preferably about 0.05 weight percent chromium salt and about 0.3 weight percent metal acetylacetonate.

As shown in FIG. 1, when a partial discharge 10, effectively a small spark, occurs within a void 12 in an electrical insulation material 14, the energy for the discharge is derived from the energy stored in the electric field within the void and the adjacent solid insulation. This energy heats, ionizes, and accelerates the gas molecules within the void. These energetic charged particles, on colliding with the inner surface of the void, can cause chemical decomposition and erosion of the insulation, resulting in gradual void enlargement and eventual failure.

In accordance with the present invention, synergistic mixtures are added to the insulation. The mixtures are themselves electrically insulating. However, it is believed that the mixtures chemically decompose upon exposure to energetic gas discharges within void 12 to form an electrically conducting layer 16 on the interior surface of the void. Conducting layer 16 should act to electrically short-circuit the void, preventing the voltage across the void from rising to a value high enough to initiate a gas discharge. Through such a process, the conducting layer is believed to suppress these discharges and prevent further damage and failure. This process is selective and self-limiting, in that discharges initially occur only in voids where the electric field reaches the discharge onset value. Discharges continue to occur until a conductivity sufficient to extinguish the discharges has been achieved, after which no further discharges occur. In general, the amount of surface conductivity required on the internal surface of a void to extinguish discharges within the void can best be determined experimentally. If the surface conductivity in the void should reduce through, for example, chemical oxidation to a point where discharges would again occur, further discharges should reestablish surface conductivity.

In using the electrical insulation materials of the invention it is believed to be necessary to insure that discharges on the external surface of the insulator do not result in formation on that surface of a conducting layer, which could eventually bridge the inter-electrode gap and cause breakdown. In most cases, however, such external surface discharges do not occur, because the surface electric fields are not high enough for discharge initiation. Surface discharges could be eliminated, for example, by using a stress-grading surface coating which reduces the maximum surface field below the discharge onset value. Alternatively, the insulator surface could be coated with a thin insulating coating not containing the proposed additive, so that even if surface discharges did occur they would not impinge on the additive and would not result in external-surface conduction.

Additional objects, advantages, and novel features of this invention will become apparent to those skilled in the art upon examination of the following examples thereof, which are not intended to be limiting, wherein parts and percentages are by weight unless otherwise indicated.

EXAMPLE 1

Epoxy-styrene-anhydride impregnating varnish was prepared generally in accordance with Example 1 of U.S. Pat. No. 4,173,593. The following were independently added to three samples of the varnish:

| Sample | Moiety | Amount (wt. %) |
| --- | --- | --- |
| 1 | chromium acetylacetonate | 0.05 |
| 2 | ferrocene | 0.3 |
| 3 | chromium acetylacetonate | 0.05 |
|   | ferrocene | 0.3 |
| 4 | iron acetylacetonate | 0.3 |
| 5 | chromium acetylacetonate | 0.05 |
|   | iron acetylacetonate | 0.3 |
| 6 | molybdenum acetylacetonate | 0.3 |
| 7 | chromium acetylacetonate | 0.05 |

-continued

| Sample | Moiety | Amount (wt. %) |
|---|---|---|
| | molybdenum acetylacetonate | 0.3 |

Figure 2:
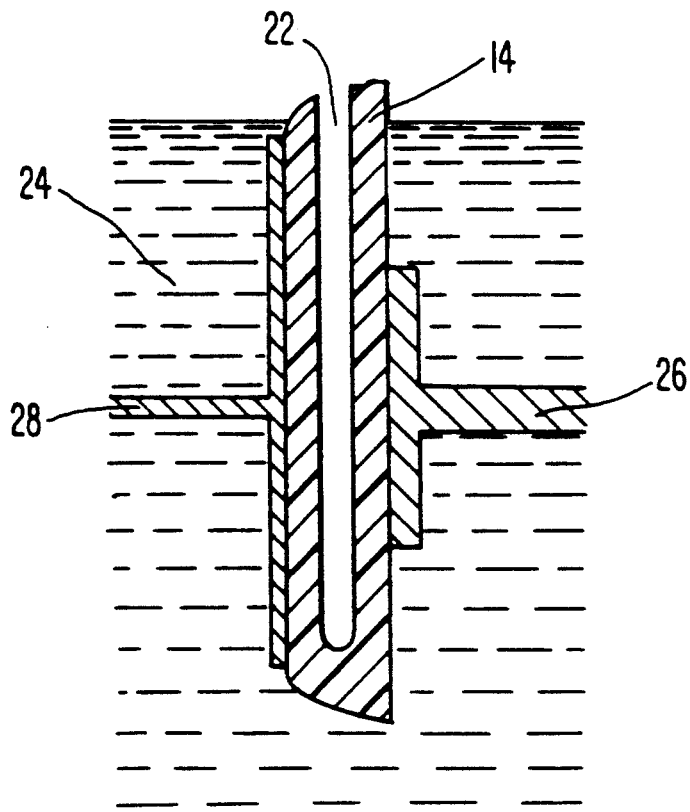
FIG. 2 is a cross-sectional view of a experimental system used in accordance with the invention to determine discharge extinction for a sample of electrical insulation material.

Each sample was allowed to cure in an a round curing dish having a diameter of about 5.5 centimeters. A 20 gram mass of each cured varnish sample was taken having approximate dimensions of 5.5 cm. (diameter) ×1.5 cm. (thickness). As shown in FIG. 2, a round hole 22 (about 0.2 cm. (diameter) ×4.5 cm. (length)) was drilled into each mass 14, which then was immersed in an oil bath 24 between a high voltage electrode 26 and a ground electrode 28. A voltage of about 15 kV was applied to the varnish to cause discharges in the drilled void. The total number of discharges were detected by standard procedures for each sample for up to about 30 hours using a sinusoidal, high voltage, AC power supply; a parallel RLC circuit; and an oscilloscope. The results are provided in FIGS. 3-5.

Figure 3:
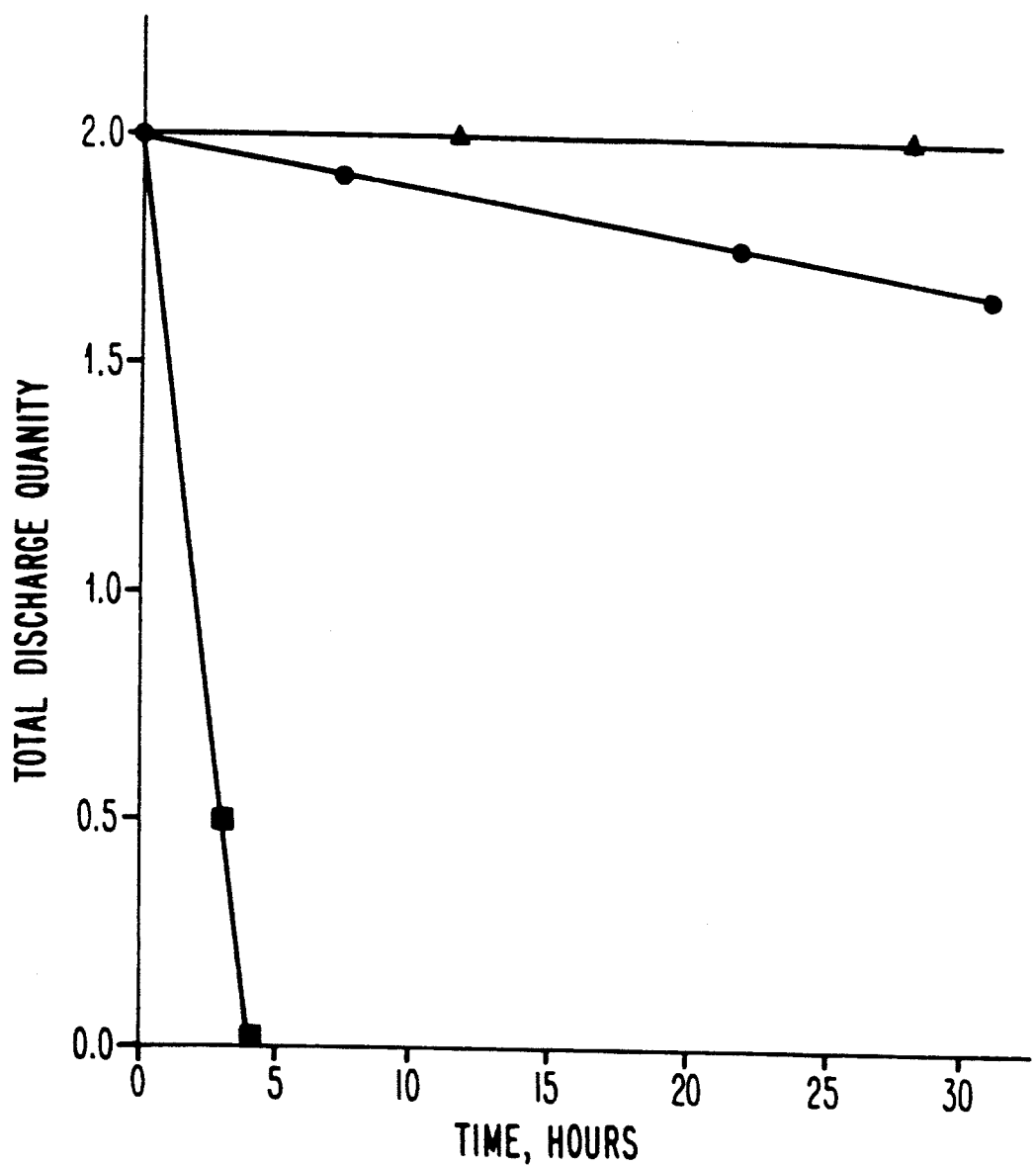
FIG. 3 is a graph showing the manner in which total discharges varies over time for insulation materials containing chromium acetylacetonate, ferrocene, and chromium acetylacetonate and ferrocene, respectively.

FIG. 3 compares Sample 1 (▲), Sample 2 (●) and Sample 3(■). As can be seen, the discharge reduction achieved by a mixture of chromium acetylacetonate and ferrocene was not only greater than achieved for either moiety alone, but also was significantly greater than would be predicted by adding the individual effects of either moiety.

Figure 4:
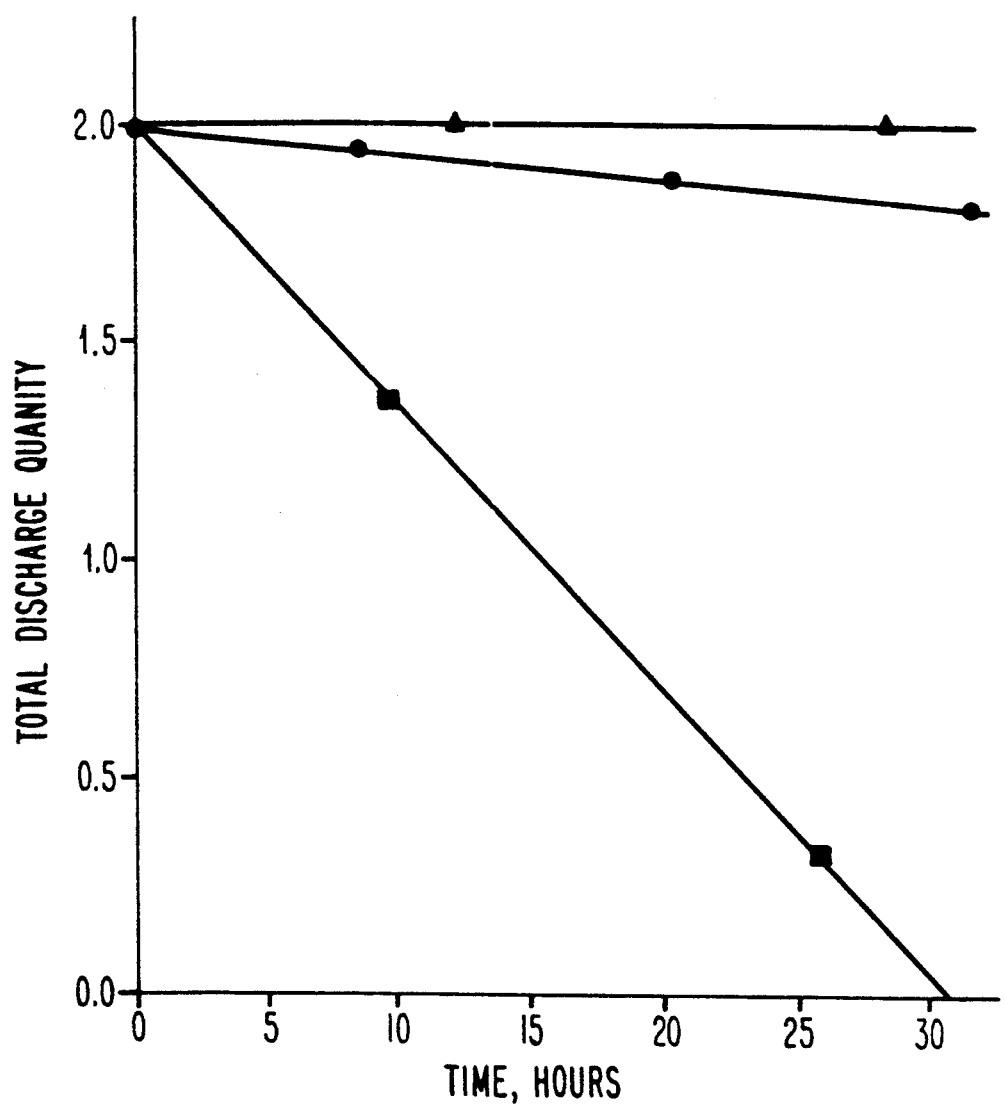
FIG. 4 is a graph showing the manner in which total discharges varies over time for insulation materials containing chromium acetylacetonate, iron acetylacetonate, and chromium acetylacetonate and iron acetylacetonate, respectively.
Figure 5:
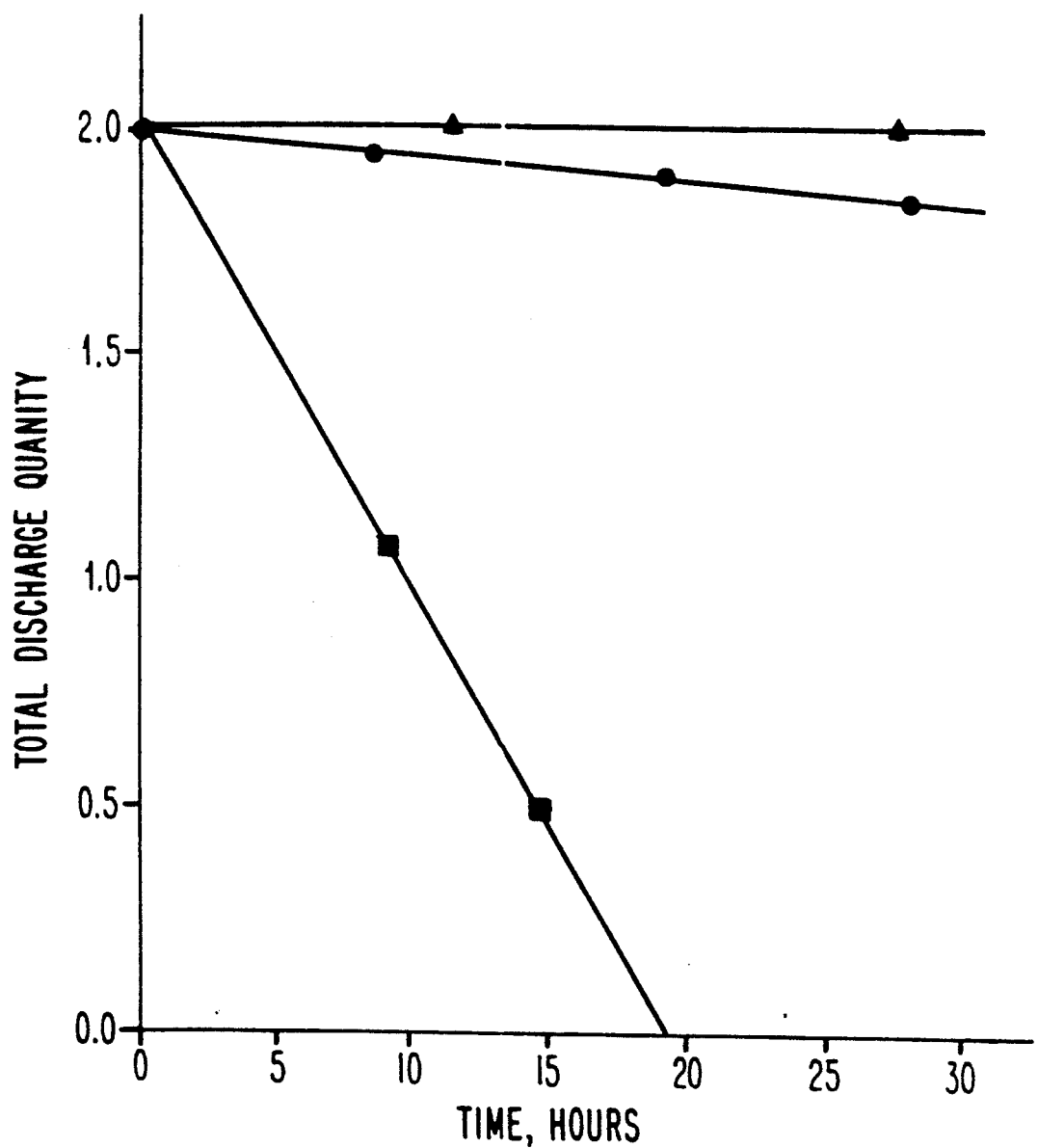
FIG. 5 is a graph showing the manner in which total discharges varies over time for insulation materials containing chromium acetylacetonate, molybdenum acetylacetonate, and chromium acetylacetonate and molybdenum acetylacetonate, respectively.

FIG. 4 compares Sample 1 (▲), Sample 4 (●), and Sample 5 (■). FIG. 5 compares Sample 1 (▲), Sample 6 (●), and Sample 7 (■). In each instance, the discharge reduction achieved by the mixture was greater than achieved for either moiety alone and greater than would be predicted by adding the individual effects of either moiety.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. An electrical insulation material comprising:
   (1) electrically insulating polymer comprising epoxy, polybutadiene, urethane, acrylic, or polyethylene resin or a combination thereof; and
   (2) an amount of a synergistic mixture of:
      a metal acetylacetonate and a dicyclopentadienyl metal compound; or
      a chromium salt other than chromium acetylacetonate and a dicyclopentadienyl metal compound;
   said amount being soluble in said polymer and effective to improve the corona resistance of said polymer.

2. The insulation material of claim 1 wherein said polymer is formed from epoxy resin.

3. The insulation material of claim 1 wherein said metal acetylacetonate is chromium (III) acetylacetonate, manganese (III) acetylacetonate, iron (III) acetylacetonate, zinc (II) acetylacetonate, aluminum (III) acetylacetonate, sodium (I) acetylacetonate, uranyl (VI) acetylacetonate, vanadium tris acetylacetonate, cobalt (II) acetylacetonate, cobalt (III) acetylacetonate, gallium acetylacetonate, or a combination thereof.

4. The insulation material of claim 1 wherein said metal acetylacetonate is chromium (III) acetylacetonate.

5. The insulation material of claim 1 wherein said dicyclopentadienyl metal compound is dicyclopentadienyl iron, dicyclopentadienyl nickel, dicyclopentadienyl cobalt, dicyclopentadienyl molybdenum dichloride, or combinations thereof.

6. The insulation material of claim 1 wherein said dicyclopentadienyl metal compound is dicyclopentadienyl iron.

7. The insulation material of claim 1 wherein said metal acetylacetonate constitutes from about 0.001 to about 0.5 weight percent and said dicyclopentadienyl metal compound constitutes from about 0.01 to about 10 weight percent of said insulation material.

8. The insulation material of claim 1 wherein said metal acetylacetonate constitutes from about 0.02 to about 0.2 weight percent and said dicyclopentadienyl metal compound constitutes from about 0.05 to about 2 weight percent of said insulation material.

9. The insulation material of claim 1 wherein said metal acetylacetonate constitutes about 0.05 weight percent and said dicyclopentadienyl metal compound constitutes about 0.3 weight percent of said insulation material.

10. The insulation material of claim 1 wherein said chromium salt constitutes from about 0.001 to about 0.5 weight percent and said dicyclopentadienyl metal compound constitutes from about 0.01 to about 10 weight percent of said insulation material.

11. The insulation material of claim 1 wherein said chromium salt constitutes from about 0.02 to about 0.2 weight percent and said dicyclopentadienyl metal compound constitutes from about 0.05 to about 2 weight percent of said insulation material.

12. The insulation material of claim 1 wherein said chromium salt constitutes about 0.05 weight percent and said dicyclopentadienyl metal compound constitutes about 0.3 weight percent of said insulation material.

13. A method for preparing an electrical insulation material containing epoxy, polybutadiene, urethane, acrylic, or polyethylene resin or a combination thereof, comprising including in said material an amount of a synergistic mixture of:
   a metal acetylacetonate and a dicyclopentadienyl metal compound; or
   a chromium salt other than chromium acetylacetonate and a dicyclopentadienyl metal compound;
said amount being soluble in said polymer and effective to improve the corona resistance of said material.

14. The method of claim 13 wherein said insulation material is formed from epoxy resin.

15. The method of claim 13 wherein said metal acetylacetonate is chromium (III) acetylacetonate.

16. The method of claim 13 wherein said dicyclopentadienyl metal compound is dicyclopentadienyl iron.

* * * * *